United States Patent
Kitagawa

(10) Patent No.: US 7,932,680 B2
(45) Date of Patent: Apr. 26, 2011

(54) DISCHARGE LAMP CONTROL DEVICE AND PROJECTOR

(75) Inventor: Kenichi Kitagawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 574 days.

(21) Appl. No.: 12/028,784

(22) Filed: Feb. 9, 2008

(65) Prior Publication Data

US 2008/0192211 A1 Aug. 14, 2008

(30) Foreign Application Priority Data

Feb. 13, 2007 (JP) ................................. 2007-032058

(51) Int. Cl.
*H05B 37/02* (2006.01)
(52) U.S. Cl. ...................................... 315/291; 315/307
(58) Field of Classification Search ............... 315/209 R, 315/224, 225, 244, 291, 302, 307, 308, DIG. 4, 315/DIG. 7
See application file for complete search history.

(56) References Cited

U.S. PATENT DOCUMENTS

| | | | |
|---|---|---|---|
| 6,765,355 B2 * | 7/2004 | Matsumoto et al. | 315/307 |
| 6,927,539 B2 | 8/2005 | Arimoto et al. | |
| 7,282,865 B2 * | 10/2007 | Van Casteren | 315/209 R |
| 7,368,881 B2 | 5/2008 | Suganuma et al. | |
| 7,391,165 B2 * | 6/2008 | Lee et al. | 315/247 |
| 7,511,432 B2 * | 3/2009 | Watanabe et al. | 315/209 R |
| 7,511,433 B2 * | 3/2009 | Okawa | 315/224 |
| 2008/0116820 A1 | 5/2008 | Ozasa et al. | |

FOREIGN PATENT DOCUMENTS

| | | |
|---|---|---|
| JP | 09-082480 | 3/1997 |
| JP | 2000-028988 | 1/2000 |
| JP | 2003-317986 A | 11/2003 |
| JP | A-2003-338392 | 11/2003 |
| JP | A-2004-172086 | 6/2004 |
| JP | 2004-335234 | 11/2004 |
| JP | A-2005-190927 | 7/2005 |
| JP | 2005-285517 | 10/2005 |
| JP | A-2006-140016 | 6/2006 |

* cited by examiner

*Primary Examiner* — Jacob Y Choi
*Assistant Examiner* — Jimmy T Vu
(74) *Attorney, Agent, or Firm* — AdvantEdge Law Group, LLP

(57) ABSTRACT

A discharge lamp control device includes: a discharge lamp driver section which drives a lamp; and a discharge lamp drive control section which performs constant current control so that a discharge lamp current that flows between electrodes of the lamp becomes constant when a discharge lamp voltage applied between the electrodes of the lamp is lower than a first voltage after the lamp has been lighted. The discharge lamp drive control section performs constant power control so that an amount of power supplied to the lamp becomes constant when the lamp voltage is equal to or higher than the first voltage and is equal to or lower than a predetermined voltage which is higher than the first voltage after the discharge lamp has been lighted; and the discharge lamp drive control section reduces the amount of power supplied to the lamp according to an increase in the discharge lamp voltage when the discharge lamp voltage is higher than the predetermined voltage after the lamp has been lighted.

20 Claims, 7 Drawing Sheets

DISCHARGE LAMP CONTROL DEVICE AND PROJECTOR

Japanese Patent Application No. 2007-32058, filed on Feb. 13, 2007, is hereby incorporated by reference in its entirety.

BACKGROUND OF THE INVENTION

The present invention relates to a discharge lamp control device and a projector.

A discharge lamp such as a high-pressure mercury lamp or a metal halide lamp is used as a light source of a projector. When lighting a discharge lamp, a high voltage of several tens of kilovolts is normally generated between electrodes of the discharge lamp in order to cause a dielectric breakdown between the electrodes of the discharge lamp to form a discharge path. The voltage (discharge lamp voltage) between the electrodes of the discharge lamp rapidly decreases immediately after the discharge lamp has been lighted. In order to heat the electrodes of the discharge lamp so that the discharge lamp voltage increases to a value near the rated voltage value, constant current control is performed so that a discharge lamp current which flows between the electrodes of the discharge lamp becomes constant when the discharge lamp voltage is lower than a predetermined voltage value. When the discharge lamp voltage has become equal to or higher than the predetermined voltage value, constant power control is performed so that the amount of power supplied to the discharge lamp becomes constant. According to a related-art method, as shown in FIG. 8A, constant power is supplied to the discharge lamp during constant power control irrespective of the discharge lamp voltage. Since the electrodes of the discharge lamp deteriorate as the period of time in which the discharge lamp is lighted increases, the discharge lamp voltage is increased to supply constant power. Specifically, when the discharge lamp has reached its terminal stage, constant power control is performed in a state in which the discharge lamp voltage is increased to a predetermined voltage value. In this case, the operation of a discharge lamp driver circuit (ballast circuit) is stopped in order to prevent explosion of the discharge lamp so that the discharge lamp stops producing light (i.e., the life of the discharge lamp expires). In a liquid crystal projector device disclosed in JP-A-2000-28988, the amount of power supplied to a discharge lamp is set at a constant value equal to or lower than the rated value from the initial stage of the discharge lamp in order to extend the life of the discharge lamp.

However, since the amount of power supplied to the discharge lamp is set at a constant value equal to or lower than the rated value from the initial stage of the discharge lamp, the luminance decreases from the initial stage of the discharge lamp. According to a related-art method, as shown in FIG. 8B, a discharge lamp current near the maximum design current value of the discharge lamp is caused to flow during constant current control in order to reduce the transition time from constant current control to constant power control. In a discharge lamp lighting device disclosed in JP-A-9-82480, for example, the discharge lamp current during constant current control is set to be higher than the discharge lamp current during constant power control. However, the electrodes of the discharge lamp are melted due to the high discharge lamp current during constant current control, whereby the life of the discharge lamp decreases.

In order to extend the life of the discharge lamp, the discharge lamp may be driven by applying an alternating current so that a current evenly flows between the electrodes of the discharge lamp. According to a related-art method, the drive frequency is set at a constant frequency, as shown in FIG. 8C. However, the electrodes of the discharge lamp are easily damaged due to a large change in current when the polarity of the discharge lamp current changes. Therefore, the electrodes of the discharge lamp deteriorate to a large extent when the drive frequency is too high, whereby the life of the discharge lamp decreases.

SUMMARY

According to a first aspect of the invention, there is provided a discharge lamp control device which controls lighting of a discharge lamp, the discharge lamp control device comprising:

a discharge lamp driver section which drives the discharge lamp; and a discharge lamp drive control section which performs constant current control so that a discharge lamp current that flows between electrodes of the discharge lamp becomes constant when a discharge lamp voltage applied between the electrodes of the discharge lamp is lower than a first voltage after the discharge lamp has been lighted, the discharge lamp drive control section reducing an amount of power supplied to the discharge lamp according to an increase in the discharge lamp voltage when the discharge lamp voltage is equal to or higher than the first voltage after the discharge lamp has been lighted.

According to a second aspect of the invention, there is provided a discharge lamp control device which controls lighting of a discharge lamp, the discharge lamp control device comprising:

a discharge lamp driver section which drives the discharge lamp; and a discharge lamp drive control section which performs constant current control so that a discharge lamp current that flows between electrodes of the discharge lamp becomes constant when a discharge lamp voltage applied between the electrodes of the discharge lamp is lower than a first voltage after the discharge lamp has been lighted, the discharge lamp drive control section performing constant power control so that an amount of power supplied to the discharge lamp becomes constant when the discharge lamp voltage is equal to or higher than the first voltage and is equal to or lower than a predetermined voltage which is higher than the first voltage after the discharge lamp has been lighted; and the discharge lamp drive control section reducing the amount of power supplied to the discharge lamp according to an increase in the discharge lamp voltage when the discharge lamp voltage is higher than the predetermined voltage after the discharge lamp has been lighted.

According to a third aspect of the invention, there is provided a projector comprising:

any of the above-described discharge lamp control devices; the discharge lamp;

an image signal input section which inputs an image signal; and an image signal output section which outputs the image signal.

DETAILED DESCRIPTION OF THE EMBODIMENT

Figure 1:
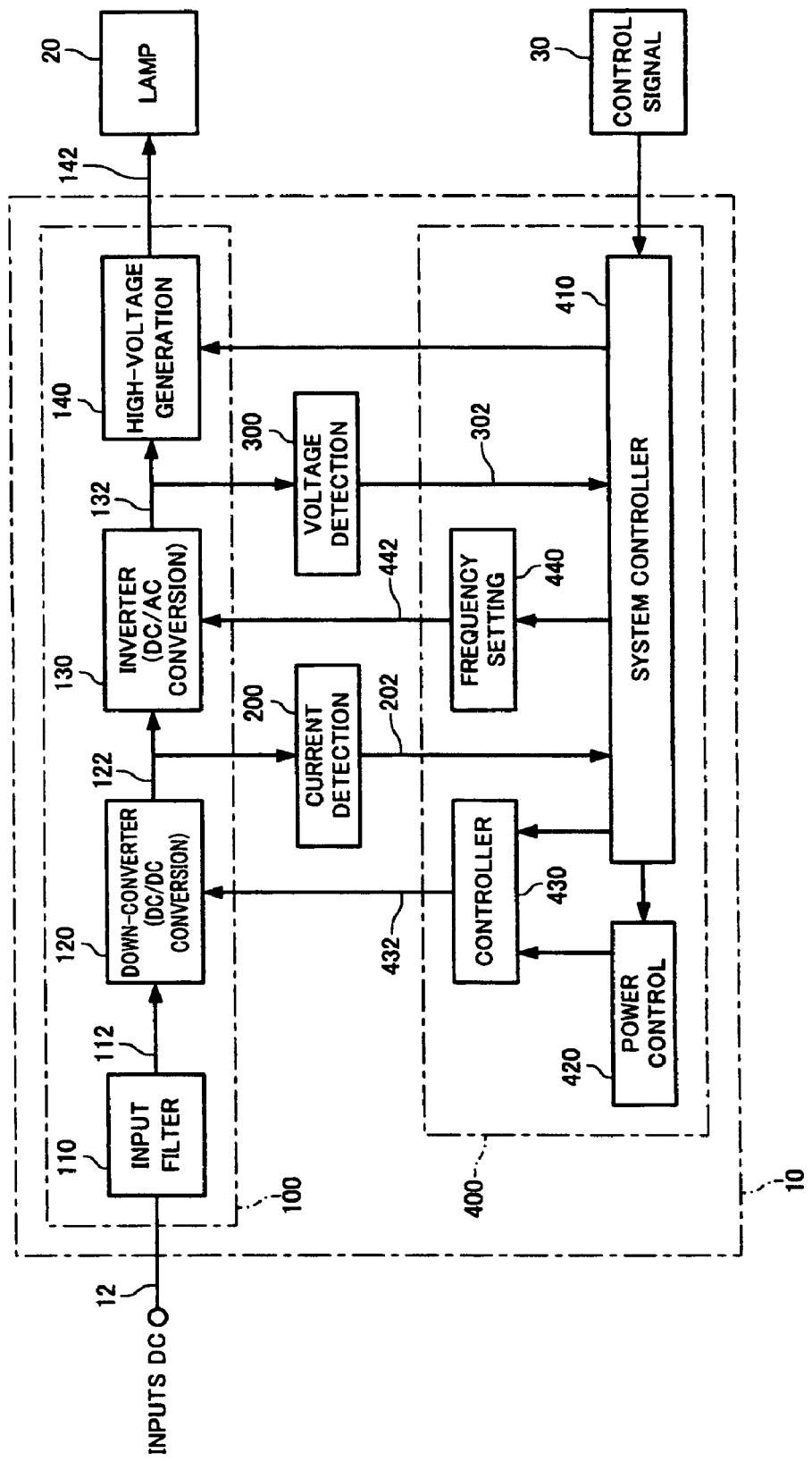
FIG. 1 is a functional block diagram showing a discharge lamp control device according to one embodiment of the invention.

The invention may provide a discharge lamp control device which extends the life of a discharge lamp.

(1) According to one embodiment of the invention, there is provided a discharge lamp control device which controls lighting of a discharge lamp, the discharge lamp control device comprising:

a discharge lamp driver section which drives the discharge lamp; and a discharge lamp drive control section which performs constant current control so that a discharge lamp current that flows between electrodes of the discharge lamp becomes constant when a discharge lamp voltage applied between the electrodes of the discharge lamp is lower than a first voltage after the discharge lamp has been lighted, the discharge lamp drive control section reducing an amount of power supplied to the discharge lamp according to an increase in the discharge lamp voltage when the lamp voltage is equal to or higher than the first voltage after the discharge lamp has been lighted.

The discharge lamp may be driven using an alternating current or a direct current. For example, the discharge lamp may be a high-pressure mercury lamp, a metal halide lamp, a xenon lamp, or the like used as a light source of a projector.

The first voltage value is a voltage value immediately after completion of constant current control after the discharge lamp has been lighted. It is preferable to set the first voltage value at a voltage value around the rated voltage in order to extend the life of the discharge lamp.

The statement "reducing the amount of power supplied to the discharge lamp according to an increase in the discharge lamp voltage" used herein refers to a relationship in which the amount of power supplied to the discharge lamp is necessarily reduced as the discharge lamp voltage increases. For example, the amount of power supplied to the discharge lamp may be linearly or nonlinearly reduced with respect to the discharge lamp voltage.

The discharge lamp control device according to the above embodiment may include a discharge lamp voltage detection section which detects the discharge lamp voltage and a discharge lamp current detection section which detects the discharge lamp current. The discharge lamp drive control section may control the discharge lamp driver section based on a voltage value detected by the discharge lamp voltage detection section and a current value detected by the discharge lamp current detection section. In this case, the discharge lamp voltage detection section may directly or indirectly detect the voltage applied between the electrodes of the discharge lamp as the discharge lamp voltage. The discharge lamp current detection section may directly or indirectly detect the current that flows between the electrodes of the discharge lamp as the discharge lamp current. The discharge lamp current detection section may detect the amplitude value of the discharge lamp current when the discharge lamp current is a rectangular wave, and may detect the amplitude value or the root-mean-square value of the discharge lamp current when the discharge lamp current is a sine wave.

According to the above embodiment, the discharge lamp current that flows between the electrodes of the discharge lamp can be reduced as compared with constant power control by gradually reducing the amount of power supplied to the discharge lamp from the initial stage of the discharge lamp as the discharge lamp voltage increases. This suppresses deterioration of the electrodes of the discharge lamp, whereby the life of the discharge lamp can be extended.

(2) According to one embodiment of the invention, there is provided a discharge lamp control device which controls lighting of a discharge lamp, the discharge lamp control device comprising:

a discharge lamp driver section which drives the discharge lamp; and a discharge lamp drive control section which performs constant current control so that a discharge lamp current that flows between electrodes of the discharge lamp becomes constant when a discharge lamp voltage applied between the electrodes of the discharge lamp is lower than a first voltage after the discharge lamp has been lighted, the discharge lamp drive control section performing constant power control so that an amount of power supplied to the discharge lamp becomes constant when the discharge lamp voltage is equal to or higher than the first voltage and is equal to or lower than a predetermined voltage which is higher than the first voltage after the discharge lamp has been lighted; and the discharge lamp drive control section reducing the amount of power supplied to the discharge lamp according to an increase in the discharge lamp voltage when the discharge lamp voltage is higher than the predetermined voltage after the discharge lamp has been lighted.

The term "predetermined voltage value higher than the first voltage value" refers to a voltage value which is higher than the first voltage value and is lower than the discharge lamp voltage value when the life of the discharge lamp expires.

The discharge lamp control device according to the above embodiment may include a discharge lamp voltage detection section which detects the discharge lamp voltage and a discharge lamp current detection section which detects the discharge lamp current. The discharge lamp drive control section may control the discharge lamp driver section based on a voltage value detected by the discharge lamp voltage detection section and a current value detected by the discharge lamp current detection section.

According to the above embodiment, the discharge lamp current that flows between the electrodes of the discharge lamp can be reduced as compared with constant power control in the terminal stage of the discharge lamp by appropriately selecting the predetermined voltage value and reducing the amount of power supplied to the discharge lamp in the terminal stage of the discharge lamp as the discharge lamp voltage increases. This suppresses deterioration of the electrodes of the discharge lamp in the terminal stage of the discharge lamp, whereby the life of the discharge lamp can be extended.

According to the above embodiment, since the constant rated power can be supplied to the discharge lamp until the discharge lamp voltage reaches the predetermined voltage value, the luminance of the discharge lamp can be maintained at a high level throughout the life of the discharge lamp by appropriately selecting the predetermined voltage value.

It is preferable that the constant power supplied during constant power control be equal to the rated power value in order to extend the life of the discharge lamp.

(3) In this discharge lamp control device, the discharge lamp driver section may drive the discharge lamp by outputting an alternating current having a given drive frequency to the discharge lamp, and the discharge lamp drive control section may include a discharge lamp drive frequency control section which causes the drive frequency when the discharge lamp voltage is lower than a second voltage which is equal to or lower than the first voltage to differ from the drive frequency when the discharge lamp voltage is higher than the second voltage.

The alternating current having a given drive frequency is supplied between the electrodes of the discharge lamp as the discharge lamp current. The alternating current having a given drive frequency may be a sine wave or a rectangular wave, for example. When the alternating current is a rectangular wave, the rectangular wave contains an odd-order harmonic in addition to a fundamental harmonic. In this case, the drive frequency refers to the frequency of the fundamental harmonic. The drive frequency may be several tens to several hundreds of hertz, or may be a higher frequency.

The second voltage value equal to or lower than the first voltage value is a discharge lamp voltage value within a range in which constant current control is performed. It is preferable that the second voltage be close to the first voltage value. The second voltage value may be equal to the first voltage value. In this case, the drive frequency during constant current control necessarily differs from the drive frequency during constant power control.

When the drive frequency when the discharge lamp voltage is lower than the second voltage value is constant and the drive frequency when the discharge lamp voltage is higher than the second voltage value is also constant, these drive frequencies may differ from each other. The drive frequency when the discharge lamp voltage is lower than the second voltage value may change and differ from the constant drive frequency when the discharge lamp voltage is higher than the second voltage value.

According to the above embodiment, when the second voltage value is close to the first voltage value, the drive frequency during almost the entire constant current control period is caused to differ from the drive frequency during constant power control. Therefore, various types of control are possible for various objectives. For example, the startup time of the discharge lamp can be reduced by increasing the drive frequency during constant current control. Moreover, since the number of times that the polarity of the discharge lamp current changes can be reduced by decreasing the drive frequency during constant current control, damage to the electrodes of the discharge lamp during constant current control can be reduced.

(4) In this discharge lamp control device, the discharge lamp drive frequency control section may cause the drive frequency when the discharge lamp voltage is lower than the second voltage to be lower than the drive frequency when the discharge lamp voltage is higher than the second voltage.

As an example of the case where the drive frequency when the discharge lamp voltage is lower than the second voltage value is lower than the drive frequency when the discharge lamp voltage is higher than the second voltage value, when the drive frequency when the discharge lamp voltage is lower than the second voltage value is constant and the drive frequency when the discharge lamp voltage is higher than the second voltage value is also constant, the drive frequency when the discharge lamp voltage is lower than the second voltage value may be lower than the drive frequency when the discharge lamp voltage is higher than the second voltage value. The drive frequency when the discharge lamp voltage is lower than the second voltage value may change and be lower than the constant drive frequency when the discharge lamp voltage is higher than the second voltage value.

The drive frequency when the discharge lamp voltage is lower than the second voltage value may be at least about half the drive frequency when the discharge lamp voltage is higher than the second voltage value. For example, the drive frequency when the discharge lamp voltage is lower than the second voltage value may be set at about 100 Hz to 150 Hz, and the drive frequency when the discharge lamp voltage is higher than the second voltage value may be set at about 200 Hz to 300 Hz.

According to the above embodiment, when the second voltage value is close to the first voltage value, the drive frequency during almost the entire constant current control period is lower than the drive frequency during constant power control. Therefore, the number of times that the polarity of the discharge lamp current changes can be reduced during constant current control. As a result, the electrodes of the discharge lamp can be prevented from being melted even if a relatively large amount of current is caused to flow between the electrodes of the discharge lamp during constant current control. Therefore, the life of the discharge lamp can be extended.

(5) In this discharge lamp control device, when the discharge lamp voltage is within a predetermined range lower than the second voltage, the discharge lamp drive frequency control section may increase the drive frequency according to an increase in the discharge lamp voltage so that the drive frequency almost successively changes when the discharge lamp voltage is in the vicinity of the second voltage.

The term "predetermined range lower than the second voltage value" may be a range between a voltage value equal to or higher than a predetermined voltage value lower than the second voltage value and a voltage value lower than the second voltage value, or may be a range including a plurality of predetermined ranges including the above range.

The statement "the drive frequency changes almost successively before the discharge lamp voltage reaches the second voltage value" used herein excludes a case where the drive frequency changes non-successively due to a rapid change in drive frequency before the discharge lamp voltage reaches the second voltage value. It is preferable that the drive frequency change gradually and successively before the discharge lamp voltage reaches the second voltage value.

The statement "increasing the drive frequency according to an increase in the discharge lamp voltage" used herein refers to a relationship in which the drive frequency necessarily increases as the discharge lamp voltage increases. For example, the drive frequency may linearly or nonlinearly increase with respect to the discharge lamp voltage.

According to the above embodiment, when the second voltage value is close to the first voltage value, a situation in which the drive frequency rapidly increases when a transition from constant current control to constant power control occurs can be prevented. This reduces the load applied to the electrodes of the discharge lamp, whereby the life of the discharge lamp can be extended.

(6) In this discharge lamp control device, the first voltage may be equal to the second voltage.

According to the above embodiment, since the drive frequency during constant current control is set to be lower than the drive frequency during constant power control, the number of times that the polarity of the discharge lamp current changes can be reduced during constant current control. As a result, the electrodes of the discharge lamp can be prevented from being melted even if a relatively large amount of current is caused to flow between the electrodes of the discharge lamp during constant current control. Therefore, the life of the discharge lamp can be extended.

(7) In this discharge lamp control device, the discharge lamp drive control section may include a constant current control correction section which causes the discharge lamp current when the discharge lamp voltage is lower than a third voltage which is equal to or lower than the first voltage to be lower than the discharge lamp current when the discharge lamp voltage is equal to the first voltage.

The third voltage value equal to or lower than the first voltage value is a discharge lamp voltage value within a range in which constant current control is performed. It is preferable that the third voltage be close to the first voltage value. The third voltage value may be equal to the first voltage value.

When performing constant power control when the discharge lamp voltage is equal to or higher than the first voltage value and is equal to or lower than a predetermined voltage value higher than the first voltage value, the discharge lamp current when the discharge lamp voltage is equal to the first voltage value is a current value calculated by dividing the constant power supplied to the discharge lamp during constant power control by the first voltage value.

According to the above embodiment, when the third voltage value is close to the first voltage value, the discharge lamp current during almost the entire constant current control period is lower than the discharge lamp current immediately after transition to constant power control has occurred. Therefore, the load applied to the electrodes of the discharge lamp can be reduced during constant current control. This prevents the electrodes of the discharge lamp from being melted, whereby the life of the discharge lamp can be extended.

(8) In this discharge lamp control device, when the discharge lamp voltage is within a predetermined range lower than the third voltage, the constant current control correction section may increase the discharge lamp current according to an increase in the discharge lamp voltage so that the discharge lamp current almost successively changes when the discharge lamp voltage is in the vicinity of the third voltage.

The term "predetermined range lower than the third voltage value" may be a range between a voltage value equal to or higher than a predetermined voltage value lower than the third voltage value and a voltage value lower than the third voltage value, or may be a range including a plurality of predetermined ranges including the above range.

The statement "the discharge lamp current changes almost successively before the discharge lamp voltage reaches the third voltage value" used herein excludes a case where the discharge lamp current changes non-successively due to a rapid change in discharge lamp current before the discharge lamp voltage reaches the third voltage value. It is preferable that the discharge lamp current change gradually and successively before the discharge lamp voltage reaches the third voltage value.

The statement "increasing the discharge lamp current according to an increase in the discharge lamp voltage" used herein refers to a relationship in which the discharge lamp current necessarily increases as the discharge lamp voltage increases. For example, the discharge lamp current may linearly or nonlinearly increase with respect to the discharge lamp voltage.

According to the above embodiment, when the third voltage value is close to the first voltage value, a situation in which the discharge lamp current rapidly increases when a transition from constant current control to constant power control occurs can be prevented. This reduces the load applied to the electrodes of the discharge lamp, whereby the life of the discharge lamp can be extended.

(9) In this discharge lamp control device, the first voltage may be equal to the third voltage.

According to the above embodiment, since the discharge lamp current during the constant current control period is set to be lower than the discharge lamp current immediately after transition to constant power control has occurred, the load applied to the electrodes of the discharge lamp can be reduced during constant current control. This prevents the electrodes of the discharge lamp from being melted, whereby the life of the discharge lamp can be extended.

(10) In this discharge lamp control device, the discharge lamp may be a light source of a projector.

According to the above embodiment, a discharge lamp control device which extends the life of a projector discharge lamp can be provided.

(11) According to one embodiment of the invention, there is provided a projector comprising:
  any of the above-described discharge lamp control devices;
  the discharge lamp;
  an image signal input section which inputs an image signal; and
  an image signal output section which outputs the image signal.

According to the above embodiment, a projector which does not require replacement of a discharge lamp for a long period of time can be provided.

Some embodiments of the invention will be described in detail below, with reference to the drawings. Note that the embodiments described below do not in any way limit the scope of the invention laid out in the claims herein. In addition, not all of the elements of the embodiments described below should be taken as essential requirements of the invention.

1. Discharge Lamp Control Device

FIG. 1 is a functional block diagram showing a discharge lamp control device according to one embodiment of the invention. A discharge lamp control device 10 controls lighting of a lamp (discharge lamp) 20. The discharge lamp control device 10 includes a discharge lamp driver section 100. The discharge lamp driver section 100 outputs an alternating current (discharge lamp current) 142 having a given drive frequency to drive the lamp (discharge lamp) 20. The discharge lamp driver section 100 includes an input filter 110, a down-converter (DC/DC conversion circuit) 120, an inverter (DC/AC conversion circuit) 130, and a high-voltage generation circuit (igniter) 140. The input filter 110 removes a high-frequency noise component contained in a direct-current input signal 12. The down-converter 120 decreases the voltage of a direct-current signal 112 (e.g., direct-current signal at 380 V) output from the input filter 110 to convert the direct-current signal 112 into a direct-current signal 122 (e.g., direct-current signal at 50 V to 130 V). The inverter 130 converts the direct-current signal 122 output from the down-converter 120 into an alternating-current signal 132 (alternating-current rectangular wave at several tens to several hundreds of hertz). The high-voltage generation circuit 140 generates a high voltage of several tens of kilovolts between the electrodes of the lamp 20 in order to cause a dielectric breakdown between the electrodes of the lamp 20 to form a discharge path when lighting the lamp 20. The operation of the high-voltage generation circuit 140 is stopped after the lamp 20 has been lighted, and the alternating-current signal 132 is supplied between the electrodes of the lamp 20 as the discharge lamp current 142. Note that the input filter 110, the down-converter 120, the inverter 130, and the high-voltage generation circuit 140 are not essential elements of the discharge lamp driver section 100. The discharge lamp driver section 100 may have a configuration other than the above-described configuration.

The discharge lamp control device 10 may include a current detection circuit 200. The current detection circuit 200 functions as a discharge lamp current detection section which detects the discharge lamp current which flows between the electrodes of the lamp (discharge lamp) 20. For example, the current detection circuit 200 detects the direct current 122 output from the down-converter 120, and supplies a detected current value 202 to a system controller 410. The current detection circuit 200 may directly or indirectly detect the discharge lamp current which flows between the electrodes of the lamp 20.

The discharge lamp control device 10 may include a voltage detection circuit 300. The voltage detection circuit 300 functions as a discharge lamp voltage detection section which detects the discharge lamp voltage applied between the electrodes of the lamp (discharge lamp) 20. For example, the voltage detection circuit 300 detects the alternating-current voltage 132 output from the inverter 130, and supplies a detected voltage value 302 to the system controller 410. The voltage detection circuit 300 may directly or indirectly detect the discharge lamp voltage applied between the electrodes of the lamp 20.

The discharge lamp control device 10 includes a discharge lamp drive control section 400. The discharge lamp drive control section 400 performs constant current control after the lamp (discharge lamp) 20 has been lighted so that the discharge lamp current 142 becomes constant when the discharge lamp voltage is lower than a first voltage value. The discharge lamp drive control section 400 may reduce the amount of power supplied to the lamp (discharge lamp) 20 according to an increase in the discharge lamp voltage when the discharge lamp voltage is equal to or higher than the first voltage value. The discharge lamp drive control section 400 may perform constant power control so that constant power is supplied to the lamp (discharge lamp) 20 when the discharge lamp voltage is equal to or higher than the first voltage value and is equal to or lower than a predetermined voltage value higher than the first voltage value, and may reduce the amount of power supplied to the lamp (discharge lamp) 20 according to an increase in the discharge lamp voltage when the discharge lamp voltage is higher than the predetermined voltage value. The discharge lamp drive control section 400 includes the system controller 410, a power control circuit 420, a controller 430, and a frequency setting circuit 440.

The system controller 410 issues instructions to the power control circuit 420, the controller 430, and the frequency setting circuit 440 based on a control signal 30 to control the discharge lamp current 142 output from the discharge lamp driver section 100. For example, the system controller 410 instructs the high-voltage generation circuit 140 to generate a high voltage between the electrodes of the lamp 20 based on the control signal 30 in order to cause a dielectric breakdown between the electrodes of the lamp 20 to form a discharge path immediately after power has been supplied.

The system controller 410 calculates the present discharge lamp voltage from the voltage value 302 detected by the voltage detection circuit 300 after the lamp 20 has been lighted, and performs constant current control when the system controller 410 has determined that the discharge lamp voltage is lower than the first voltage value. When the system controller 410 performs constant current control, the system controller 410 calculates the present discharge lamp current from the current value 202 detected by the current detection circuit 200, and instructs the controller 430 to generate a control signal 432 for keeping the discharge lamp current constant to control the voltage or current of the direct-current signal 122 output from the down-converter 120. Specifically, the system controller 410 increases the voltage or current of the direct-current signal 122 when the present discharge lamp current is lower than a constant current value, and decreases the voltage or current of the direct-current signal 122 when the present discharge lamp current is higher than the constant current value. When the system controller 410 has determined that the discharge lamp voltage is higher than the first voltage value, the system controller 410 calculates the amount of power (i.e., the product of the discharge lamp current and the discharge lamp voltage) currently supplied to the lamp 20, and supplies information relating to the present discharge lamp voltage value and the present power value to the power control circuit 420. The power control circuit 420 may instruct the controller 430 to generate the control signal 432 for decreasing the amount of power supplied to the lamp 20 according to an increase in the discharge lamp voltage to control the voltage or current of the direct-current signal 122 output from the down-converter 120. The power control circuit 420 may instruct the controller 430 to perform constant power control so that constant power is supplied to the lamp 20 when the discharge lamp voltage is equal to or higher than the first voltage value and is equal to or lower than the predetermined voltage value higher than the first voltage value, and instruct the controller 430 to generate the control signal 432 for decreasing the amount of power supplied to the lamp 20 according to an increase in the discharge lamp voltage when the discharge lamp voltage is higher than the predetermined voltage value to control the voltage or current of the direct-current signal 122 output from the down-converter 120. Specifically, when the discharge lamp voltage is equal to or higher than the first voltage value and is equal to or lower than the predetermined voltage value, the power control circuit 420 may increase the voltage or current of the direct-current signal 122 when the amount of power currently supplied to the lamp 20 is lower than a constant power value, and may decrease the voltage or current of the direct-current signal 122 when the amount of power currently supplied to the lamp 20 is higher than the constant power value to keep the amount of power supplied to the lamp 20 constant.

The system controller 410 and the frequency setting circuit 440 function as a discharge lamp drive frequency control section which causes the drive frequency when the discharge lamp voltage is lower than a second voltage value equal to or lower than the first voltage value to differ from the drive frequency when the discharge lamp voltage is higher than the second voltage value. The system controller 410 and the frequency setting circuit 440 may function as a discharge lamp drive frequency control section which causes the drive frequency when the discharge lamp voltage is lower than the second voltage value to be lower than the drive frequency when the discharge lamp voltage is higher than the second voltage value. For example, when the first voltage value is equal to the second voltage value, the system controller 410 may supply a predetermined setting value to the frequency setting circuit 440 so that the frequency of the alternating-current signal 132 (drive frequency of the discharge lamp current 142) output from the inverter 130 during constant current control is lower than the frequency of the alternating-current signal 132 during constant power control, and the frequency setting circuit 440 may generate a control signal 442 based on the setting value to control the inverter 130. The system controller 410 and the frequency setting circuit 440 may function as a discharge lamp drive frequency control section which increases the drive frequency according to an increase in the discharge lamp voltage so that the drive frequency changes almost successively before the discharge lamp voltage reaches the second voltage value when the discharge lamp voltage is equal to a voltage value within a predetermined range lower than the second voltage value.

The system controller 410 and the controller 430 may function as a constant current control correction section which makes a correction so that the discharge lamp current when the discharge lamp voltage is lower than a third voltage value equal to or lower than the first voltage value is lower than the discharge lamp current when the discharge lamp voltage is equal to the first voltage value. For example, when the first voltage value is equal to the third voltage value, the system controller 410 may instruct the controller 430 to generate the control signal 432 which causes the discharge lamp current during constant current control to be lower than the discharge lamp current when the discharge lamp voltage is equal to the first voltage value to correct the voltage or current of the direct-current signal 122 output from the down-converter 120. The system controller 410 and the controller 430 may function as a constant current control correction section which increases the discharge lamp current according to an increase in the discharge lamp voltage so that the discharge lamp current changes almost successively before the discharge lamp voltage reaches the third voltage value when the discharge lamp voltage is equal to a voltage value within a predetermined range lower than the third voltage value.

Note that the system controller 410, the power control circuit 420, the controller 430, and the frequency setting circuit 440 are not essential elements of the discharge lamp drive control section 400. The discharge lamp drive control section 400 may have a configuration other than the above-described configuration. The discharge lamp drive control section 400 may be implemented by hardware (i.e., dedicated circuit), or may be implemented by software (i.e., control program which can be executed by a general-purpose CPU), or may be implemented by hardware and software.

Figure 2:
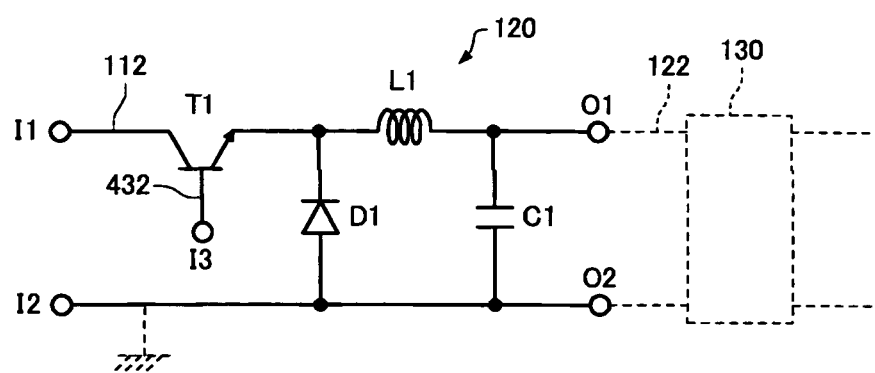
FIG. 2 is a diagram illustrative of a configuration example of a down-converter (DC/DC conversion circuit).

FIG. 2 is a diagram illustrative of a configuration example of the down-converter (DC/DC conversion circuit). The down-converter (DC/DC conversion circuit) 120 is configured as a step-down chopper circuit including an NPN-type transistor T1, a diode D1, a coil L1, and a capacitor C1. A collector terminal of the transistor T1 is connected to an input terminal I1. An emitter terminal of the transistor T1 is connected to a cathode terminal of the diode D1 and one end of the coil L1. A base terminal of the transistor T1 is connected to an input terminal I3. One end of the capacitor C1 is connected to the other end of the coil L1 and an output terminal O1. The other end of the capacitor C1 is connected to an anode terminal of the diode D1, an input terminal I2, and an output terminal O2. The output terminals O1 and O2 are connected to the inverter 130 (see FIG. 1). The direct-current signal 122 (see FIG. 1) is output from the output terminal O1. The direct-current signal 112 (see FIG. 1) output from the input filter 110 (see FIG. 1) is supplied to the input terminal I1. A constant potential (e.g., ground potential) is supplied to the input terminal I2. A constant direct-current voltage (e.g., 380 V) is applied between the input terminals I1 and I2. The control signal 432 (see FIG. 1) which ON/OFF-controls the transistor T1 is supplied to the input terminal I3.

When the transistor T1 is turned ON, a current flows through the coil L1 so that energy is stored in the coil L1. When the transistor T1 is turned OFF, the energy stored in the coil L1 is discharged through a path which passes through the capacitor C1 and the diode D1. As a result, the voltage applied between the input terminals I1 and I2 is decreased so that a direct-current voltage (e.g., 50 V to 130 V) proportional to the ratio of the period of time in which the transistor T1 is turned ON is generated between the output terminals O1 and O2.

For example, the system controller 410 shown in FIG. 1 causes a predetermined direct-current voltage to be generated between the output terminals O1 and O2 by adjusting the duty of the control signal 432 generated by the controller 430 to ON/OFF-control the transistor T1. Specifically, the system controller 410 causes a predetermined direct-current voltage to be generated between the output terminals O1 and O2 during constant current control so that the discharge lamp current is equal to a desired constant current value, and adjusts the duty of the control signal 432 during constant power control so that a predetermined direct-current voltage is generated between the output terminals O1 and O2 so that the amount of power (i.e., the product of the discharge lamp current and the discharge lamp voltage) supplied to the discharge lamp is equal to a desired constant power value.

A resistor may be inserted between the anode terminal of the diodes D1 and the input terminal I2, and the current detection circuit 200 (see FIG. 1) may detect a current which flows through the resistor. Two resistors may be connected in series between the output terminal O1 and ground, and the voltage detection circuit 300 (see FIG. 1) may detect a voltage divided at the resistance ratio of the resistors.

Figure 3:
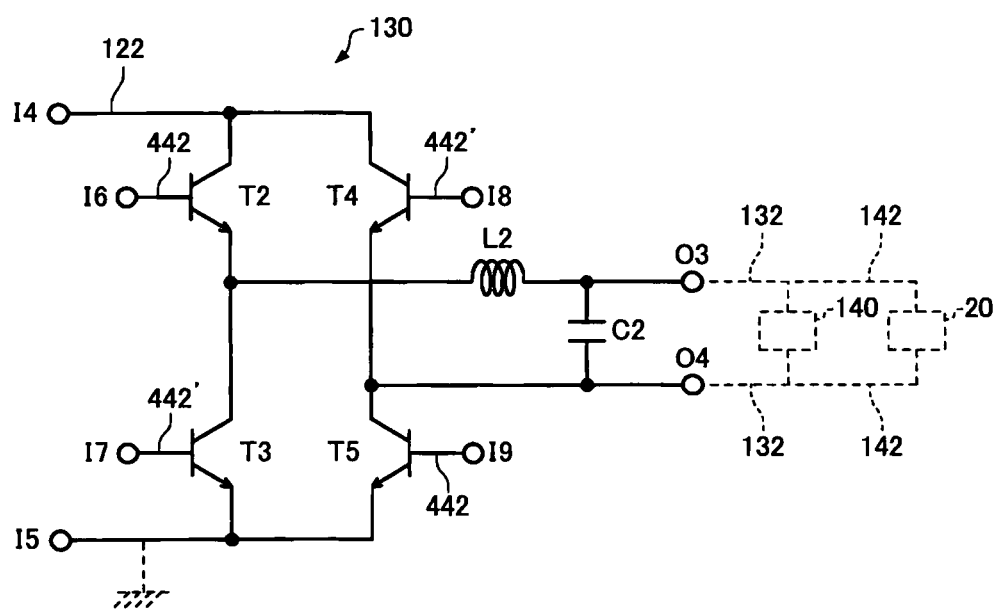
FIG. 3 is a diagram illustrative of a configuration example of an inverter (DC/AC conversion circuit).

FIG. 3 is a diagram illustrative of a configuration example of the inverter (DC/AC conversion circuit). The inverter (DC/AC conversion circuit) 130 is configured as a full-bridge inverter circuit including four NPN-type transistors T2 to T5, a coil L2, and a capacitor C2. A collector terminal of the transistor T2 is connected to an input terminal I4 and a collector terminal of the transistor T4. An emitter terminal of the transistor T2 is connected to a collector terminal of the transistor T3 and one end of the coil L2. A base terminal of the transistor T2 is connected to an input terminal I6. An emitter terminal of the transistor T5 is connected to an input terminal I5 and an emitter terminal of the transistor T3. A collector terminal of the transistor T5 is connected to an emitter terminal of the transistor T4, one end of the coil L2, and an output terminal O4. A base terminal of the transistor T5 is connected to an input terminal I9. A base terminal of the transistor T3 is connected to an input terminal I7. A base terminal of the transistor T4 is connected to an input terminal I8. The other end of the capacitor C2 is connected to the other end of the coil L2 and an output terminal O3. The output terminals O3 and O4 are respectively connected to the electrodes of the lamp 20 (see FIG. 1). The alternating-current signal 132 (see FIG. 1) is output through the output terminals O3 and O4. The high-voltage generation circuit 140 (see FIG. 1) is connected between the output terminals O3 and O4. The output terminals O1 and O2 (see FIG. 2) of the down-converter 120 are respectively connected to the input terminals I4 and I5. The direct-current signal 122 (FIG. 1 and see FIG. 2) output from the down-converter 120 is supplied to the input terminal I4. A constant potential (e.g., ground potential) is supplied to the input terminal I5. A constant direct-current voltage (e.g., 50 V to 130 V) is applied between the input terminals 14 and 15. The control signals 442 (see FIG. 1) which respectively ON/OFF-control the transistors T2 and T5 are supplied to the input terminals I6 and I9. Control signals 442' (inverted signal of the control signal 442) which respectively ON/OFF-control the transistors T3 and T4 are supplied to the input terminals I7 and I8. Specifically, the transistors T3 and T4 are turned OFF when the transistors T2 and 15 are turned ON, and the transistors T3 and T4 are turned ON when the transistors T2 and T5 are turned OFF. Therefore, the alternating-current discharge lamp current 142 (see FIG. 1) of which the polarity changes cyclically is supplied between the electrodes of the lamp 20 (see FIG. 1) connected to the output terminals O3 and O4 by causing the transistors T2 and T5 and the transistors T3 and T4 to be exclusively turned ON/OFF in a predetermined cycle. Since the ON/OFF frequency of the transistors T2 to T5 serves as the drive frequency, the system controller 410 shown in FIG. 1 adjusts the frequency of the control signal 442 (e.g., rectangular-wave signal) generated by the frequency setting circuit 440 so that the discharge lamp current 142 having a predetermined drive frequency is supplied between the electrodes of the lamp 20 through the output terminals O3 and O4.

Figure 4A:
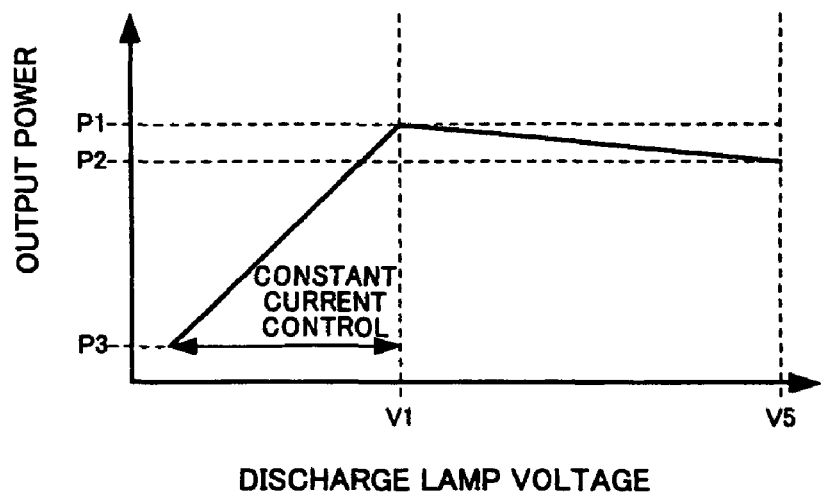
FIGS. 4A and 4B show graphs illustrative of a first example and a second example of the control relationship between a discharge lamp voltage and the amount of power supplied to a discharge lamp.
Figure 4B:
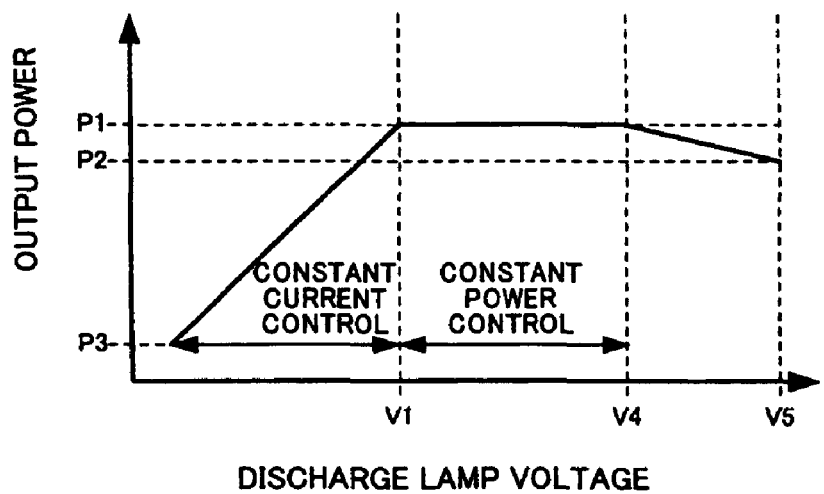

FIGS. 4A and 4B show graphs illustrative of the control relationship between the discharge lamp voltage and the amount of power supplied to the discharge lamp. In FIGS. 4A and 4B, the horizontal axis indicates the discharge lamp voltage, and the vertical axis indicates the amount of power supplied to the discharge lamp. In FIGS. 4A and 4B, constant current control is performed when the discharge lamp voltage is lower than a voltage value V1 (first voltage value) so that the amount of power supplied to the discharge lamp increases from P3 to P1 in proportion to the discharge lamp voltage. In FIGS. 4A and 4B, the operation of the discharge lamp driver section is stopped when the discharge lamp voltage has reached a voltage value V5. Specifically, the life of the discharge lamp expires when the discharge lamp voltage has reached the voltage value V5.

FIG. 4A shows a graph illustrative of a first example of the control relationship between the discharge lamp voltage and the amount of power supplied to the discharge lamp. In FIG. 4A, when the discharge lamp voltage is equal to or higher than the voltage value V1 (first voltage value), the amount of power supplied to the discharge lamp decreases from P1 to P2 according to an increase in the discharge lamp voltage. Since the amount of power supplied to the discharge lamp is gradually reduced from the initial stage of the discharge lamp in which the discharge lamp voltage becomes stable at a voltage value near the voltage value V1 according to an increase in the discharge lamp voltage, the discharge lamp current which flows between the electrodes of the discharge lamp can be further reduced as compared with the case of performing constant power control at the power value P1. This suppresses deterioration in the electrodes of the discharge lamp, whereby the life of the discharge lamp can be extended.

FIG. 4B shows a graph illustrative of a second example of the control relationship between the discharge lamp voltage and the amount of power supplied to the discharge lamp. In FIG. 4B, when the discharge lamp voltage is equal to or higher than the voltage value V1 (first voltage value) and is equal to or lower than a voltage value V4 (predetermined voltage value higher than the first voltage value), constant power control is performed so that the amount of power supplied to the discharge lamp is equal to the constant value P1. When the discharge lamp voltage is higher than the voltage value V4 (predetermined voltage value), the amount of power supplied to the discharge lamp is decreased from P1 to P2 according to an increase in the discharge lamp voltage. Since the amount of power supplied to the discharge lamp is decreased according to an increase in the discharge lamp voltage in the terminal stage of the discharge lamp (i.e., when the discharge lamp voltage is equal to or higher than the voltage value V4) by appropriately selecting the voltage value V4, the discharge lamp current which flows between the electrodes of the discharge lamp can be further reduced in the terminal stage of the discharge lamp as compared with the case of performing constant power control at the power value P1. This suppresses deterioration in the electrodes of the discharge lamp in the terminal stage of the discharge lamp, whereby the life of the discharge lamp can be extended. The luminance of the discharge lamp can be maintained at a high level throughout the life of the discharge lamp by supplying a constant rated power to the discharge lamp until the discharge lamp voltage reaches the voltage value V4.

It is preferable that the constant power value P1 during constant power control be equal to the rated power value in order to extend the life of the discharge lamp.

In FIGS. 4A and 4B, the power value P2 when the discharge lamp voltage is set at the voltage value V5 may be 90 to 95% or more of the power value P1, for example, although the power value varies depending on the type of discharge lamp.

FIGS. 5A to 5F show graphs illustrative of the control relationship between the discharge lamp voltage and the drive frequency. In FIGS. 5A to 5F, the horizontal axis indicates the discharge lamp voltage, and the vertical axis indicates the drive frequency. Constant current control is performed when the discharge lamp voltage is lower than the voltage value V1 (first voltage value), and constant power control is performed when the discharge lamp voltage is set at a voltage value between the voltage value V1 and the voltage value V4 (predetermined voltage value higher than the first voltage value). The operation of the discharge lamp driver section is stopped when the discharge lamp voltage has reached the voltage value V5. Specifically, the life of the discharge lamp expires when the discharge lamp voltage has reached the voltage value V5. In FIGS. 5A to 5F, the drive frequency when the discharge lamp voltage is lower than the voltage value V2 (second voltage value) equal to or lower than the voltage value V1 is set to be lower than the drive frequency when the discharge lamp voltage is higher than the voltage value V2.

Figure 5A:
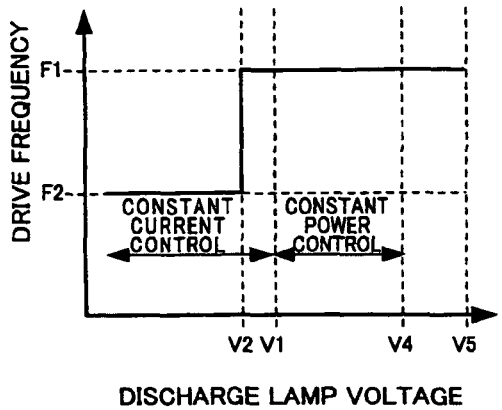
FIGS. 5A to 5F show graphs illustrative of a first example to a sixth example of the control relationship between a discharge lamp voltage and a drive frequency.

FIG. 5A shows a graph illustrative of a first example of the control relationship between the discharge lamp voltage and the drive frequency. In FIG. 5A, the drive frequency when the discharge lamp voltage is lower than the voltage value V2 is set at a constant value F2. The drive frequency when the discharge lamp voltage is higher than the voltage value V2 is set at a constant value F1.

Figure 5D:
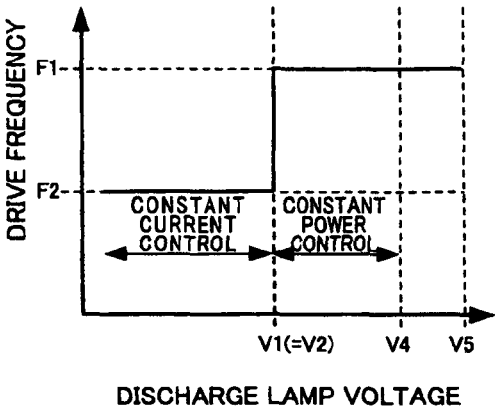
Figure 5B:
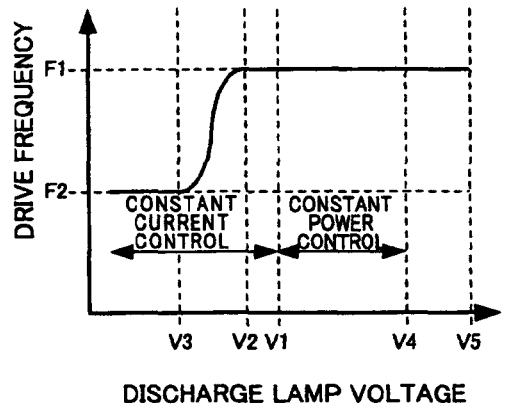

FIG. 5B shows a graph illustrative of a second example of the control relationship between the discharge lamp voltage and the drive frequency. In FIG. 5B, the drive frequency when the discharge lamp voltage is lower than the voltage value V3 is set at the constant value F2. When the discharge lamp voltage is set at a voltage value in the range between voltage values V3 and V2 (voltage value within a predetermined range lower than the second voltage value), the drive frequency is increased from the value F2 to the value F1 according to an increase in the discharge lamp voltage so that the drive frequency successively changes to the value F1 before the discharge lamp voltage reaches the voltage value V2 (second voltage value). The drive frequency when the discharge lamp voltage is higher than the voltage value V2 is set at the constant value F1.

Figure 5E:
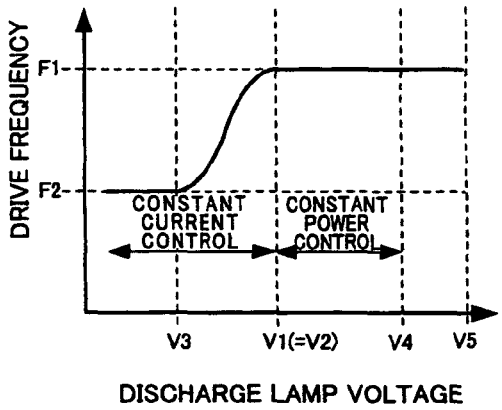
Figure 5C:
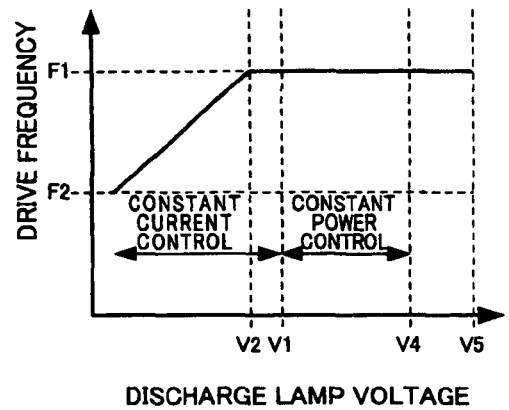

FIG. 5C shows a graph illustrative of a third example of the control relationship between the discharge lamp voltage and the drive frequency. In FIG. 5C, when the discharge lamp voltage is set at a voltage value lower than the voltage value V2 (voltage value within a predetermined range lower than the second voltage value), the drive frequency is increased from the value F2 to the value F1 according to an increase in the discharge lamp voltage so that the drive frequency successively changes to the value F1 before the discharge lamp voltage reaches the voltage value V2 (second voltage value). The drive frequency when the discharge lamp voltage is higher than the voltage value V2 is set at the constant value F1.

According to the control relationships shown in FIGS. 5A to 5C, the number of times that the polarity of the discharge lamp current changes during constant current control can be reduced when the voltage value V1 is relatively close to the voltage value V2. As a result, the electrodes of the discharge lamp can be prevented from being melted even if a relatively large amount of current is caused to flow between the electrodes of the discharge lamp during constant current control, whereby the life of the discharge lamp can be extended. According to the control relationship shown in FIG. 5B or 5C, a situation in which the frequency of the discharge lamp current rapidly increases before a transition from constant current control to constant power control occurs can be prevented so that the load applied to the electrodes of the discharge lamp can be reduced.

FIG. 5D shows a graph illustrative of a fourth example of the control relationship between the discharge lamp voltage and the drive frequency. FIG. 5D shows the case where the voltage value V1 (first voltage value) is equal to the voltage value V2 (second voltage value) in the control relationship shown in FIG. 5A. Specifically, the drive frequency when the discharge lamp voltage is lower than the voltage value V1 (=V2) (during constant current control) is set at the constant value F2. The drive frequency when the discharge lamp voltage is higher than the voltage value V1 is set at the constant value F1.

FIG. 5E shows a graph illustrative of a fifth example of the control relationship between the discharge lamp voltage and the drive frequency. FIG. 5E shows the case where the voltage value V1 (first voltage value) is equal to the voltage value V2 (second voltage value) in the control relationship shown in FIG. 5B. Specifically, the drive frequency when the discharge lamp voltage is lower than the voltage value V3 is set at the constant value F2. When the discharge lamp voltage is set at a voltage value in the range between voltage value V3 and the voltage value V1 (=V2) (voltage value within a predetermined range lower than the second voltage value), the drive frequency is increased from the value F2 to the value F1 according to an increase in the discharge lamp voltage so that the drive frequency successively changes to the value F1 before the discharge lamp voltage reaches the voltage value V1 (=V2 (second voltage value)). The drive frequency when the discharge lamp voltage is higher than the voltage value V1 is set at the constant value F1.

Figure 5F:
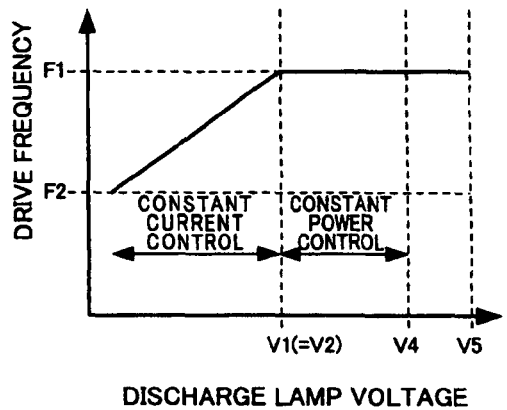

FIG. 5F shows a graph illustrative of a sixth example of the control relationship between the discharge lamp voltage and the drive frequency. FIG. 5F shows the case where the voltage value V1 (first voltage value) is equal to the voltage value V2 (second voltage value) in the control relationship shown in FIG. 5C. Specifically, when the discharge lamp voltage is set at a voltage value lower than the voltage value V1 (=V2) (voltage value within a predetermined range lower than the second voltage value), the drive frequency is increased from the value F2 to the value F1 according to an increase in the discharge lamp voltage so that the drive frequency successively changes to the value F1 before the discharge lamp voltage reaches the voltage value V1 (=V2 (second voltage value)). The drive frequency when the discharge lamp voltage is higher than the voltage value V1 is set at the constant value F1.

According to the control relationships shown in FIGS. 5D to 5F, the number of times that the polarity of the discharge lamp current changes during constant current control can be reduced. As a result, the electrodes of the discharge lamp can be prevented from being melted even if a relatively large amount of current is caused to flow between the electrodes of the discharge lamp during constant current control, whereby the life of the discharge lamp can be extended. According to the control relationship shown in FIG. 5E or 5F, a situation in which the frequency of the discharge lamp current rapidly increases when a transition from constant current control to constant power control occurs can be prevented so that the load applied to the electrodes of the discharge lamp can be reduced.

In the control relationship shown in FIGS. 5B and 5E, the drive frequency is nonlinearly increased from the value F2 to the value F1. Note that the drive frequency may be linearly increased from the value F2 to the value F1. In the control relationship shown in FIGS. 5C and 5F, the drive frequency is linearly increased from the value F2 to the value F1. Note that the drive frequency may be nonlinearly increased from the value F2 to the value F1.

FIGS. 6A to 6F show graphs illustrative of the control relationship between the discharge lamp voltage and the discharge lamp current. In FIGS. 6A to 6F, the horizontal axis indicates the discharge lamp voltage, and the vertical axis indicates the discharge lamp current. Constant current control is performed when the discharge lamp voltage is lower than the voltage value V1 (first voltage value). Constant power control is performed when the discharge lamp voltage is set at a voltage value between the voltage value V1 and the voltage value V4 (predetermined voltage value higher than the first voltage value). The discharge lamp current is in inverse proportion to the discharge lamp voltage so that the amount of power supplied to the discharge lamp is constant. Since the amount of power supplied to the discharge lamp is decreased when the discharge lamp voltage is set at a voltage value between the voltage values V4 and V5, the attenuation factor of the discharge lamp current is larger between the voltage values V4 and V5 than that between the voltage values V1 and V4. Therefore, the life of the discharge lamp can be extended in the terminal stage of the discharge lamp. The operation of the discharge lamp driver section is stopped when the discharge lamp voltage has reached the voltage value V5. Specifically, the life of the discharge lamp expires when the discharge lamp voltage has reached the voltage value V5. In FIGS. 6A to 6F, a correction is made so that the discharge lamp current when the discharge lamp voltage is lower than the voltage value V2 (third voltage value) equal to or lower than the voltage value V1 is lower than the discharge lamp current when the discharge lamp voltage is equal to the voltage value V1 (first voltage value).

Figure 6A:
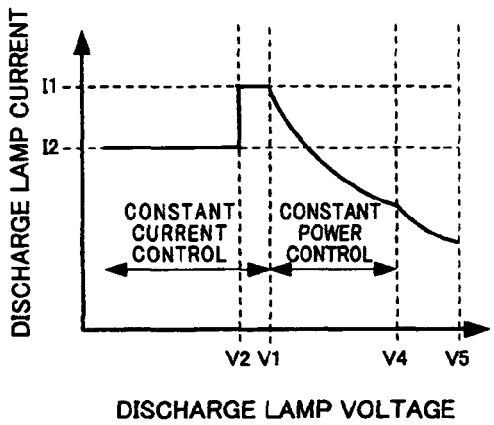
FIGS. 6A to 6F show graphs illustrative of a first example to a sixth example of the control relationship between a discharge lamp voltage and a discharge lamp current.

FIG. 6A shows a graph illustrative of a first example of the control relationship between the discharge lamp voltage and the discharge lamp current. In FIG. 6A, the discharge lamp current when the discharge lamp voltage is lower than the voltage value V2 is set at a constant value I2. The discharge lamp current when the discharge lamp voltage is set at a voltage value between the voltage values V2 and V1 is set at a constant value I1.

Figure 6D:
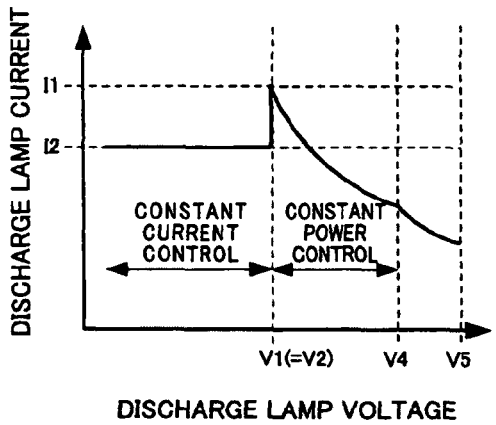
Figure 6B:
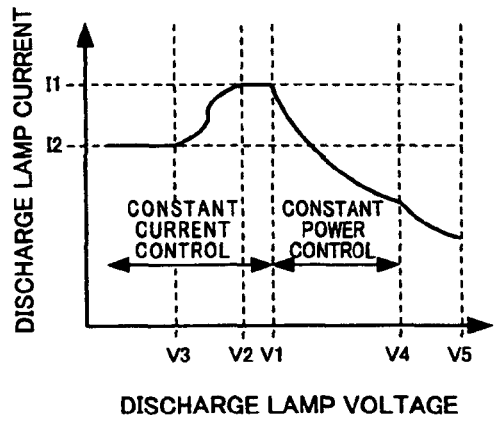

FIG. 6B shows a graph illustrative of a second example of the control relationship between the discharge lamp voltage and the discharge lamp current. In FIG. 6B, the discharge lamp current when the discharge lamp voltage is lower than the voltage value V3 is set at the constant value I2. When the discharge lamp voltage is set at a voltage value between the voltage values V3 and V2 (voltage value within a predetermined range lower than the third voltage value), the discharge lamp current is increased from the value I2 to the value I1 according to an increase in the discharge lamp voltage so that the discharge lamp current successively changes to the value I1 before the discharge lamp voltage reaches the voltage value V2 (third voltage value). The discharge lamp current when the discharge lamp voltage is set at a voltage value between the voltage values V2 and V1 is set at the constant value I1.

Figure 6E:
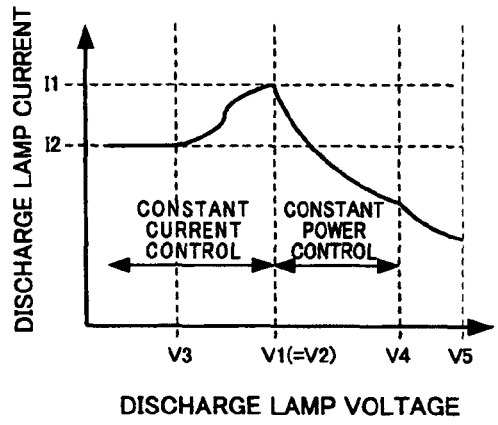
Figure 6C:
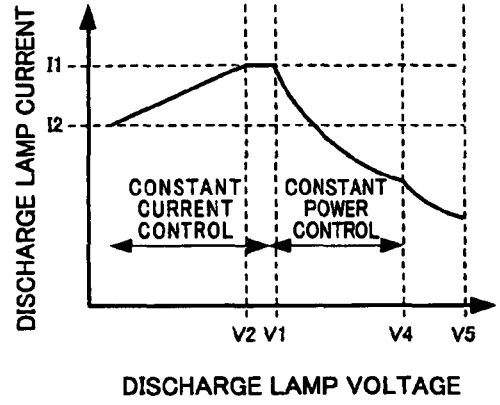

FIG. 6C shows a graph illustrative of a third example of the control relationship between the discharge lamp voltage and the discharge lamp current. In FIG. 6C, when the discharge lamp voltage is set at a voltage value lower than the voltage value V2 (voltage value within a predetermined range lower than the third voltage value), the discharge lamp current is increased from the value I2 to the value I1 according to an increase in the discharge lamp voltage so that the discharge lamp current successively changes to the value I1 before the discharge lamp voltage reaches the voltage value V2 (third voltage value). The discharge lamp current when the discharge lamp voltage is set at a voltage value between the voltage values V2 and V1 is set at the constant value I1.

According to the control relationships shown in FIGS. 6A to 6C, the discharge lamp current during constant current control can be reduced when the voltage value V1 is relatively close to the voltage value V2. As a result, the electrodes of the discharge lamp can be prevented from being melted during constant current control, whereby the life of the discharge lamp can be extended. According to the control relationship shown in FIG. 6B or 6C, a situation in which the discharge lamp current rapidly increases before a transition from constant current control to constant power control occurs can be prevented so that the load applied to the electrodes of the discharge lamp can be reduced.

FIG. 6D shows a graph illustrative of a fourth example of the control relationship between the discharge lamp voltage and the discharge lamp current. FIG. 6D shows the case where the voltage value V1 (first voltage value) is equal to the voltage value V2 (third voltage value) in the control relationship shown in FIG. 6A. Specifically, the discharge lamp current when the discharge lamp voltage is lower than the voltage value V1 (=V2) (during constant current control) is set at the constant value I2.

FIG. 6E shows a graph illustrative of a fifth example of the control relationship between the discharge lamp voltage and the discharge lamp current. FIG. 6E shows the case where the voltage value V1 (first voltage value) is equal to the voltage value V2 (third voltage value) in the control relationship shown in FIG. 6B. Specifically, the discharge lamp current when the discharge lamp voltage is lower than the voltage value V3 is set at the constant value I2. When the discharge lamp voltage is set at a voltage value in the range between voltage value V3 and the voltage value V1 (=V2) (voltage value within a predetermined range lower than the third voltage value), the discharge lamp current is increased from the value I2 to the value I1 according to an increase in the discharge lamp voltage so that the discharge lamp current successively changes to the value I1 before the discharge lamp voltage reaches the voltage value V1 (=V2 (third voltage value)).

Figure 6F:
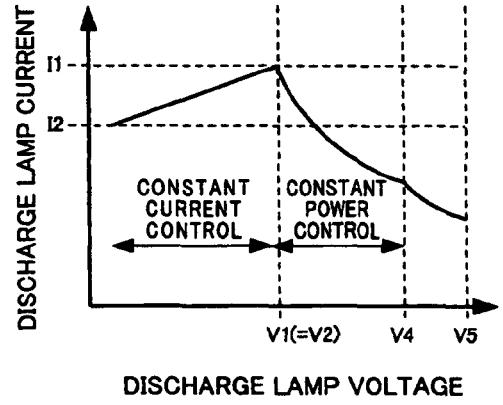

FIG. 6F shows a graph illustrative of a sixth example of the control relationship between the discharge lamp voltage and the discharge lamp current. FIG. 6F shows the case where the voltage value V1 (first voltage value) is equal to the voltage value V2 (third voltage value) in the control relationship shown in FIG. 6C. Specifically, when the discharge lamp voltage is set at a voltage value lower than the voltage value V1 (=V2) (voltage value within a predetermined range lower than the third voltage value), the discharge lamp current is increased from the value I2 to the value I1 according to an increase in the discharge lamp voltage so that the discharge lamp current successively changes to the value I1 before the discharge lamp voltage reaches the voltage value V1 (=V2 (third voltage value)).

According to the control relationships shown in FIGS. 6D to 6F, the discharge lamp current can be reduced during constant current control. As a result, the electrodes of the discharge lamp can be prevented from being melted during constant current control, whereby the life of the discharge lamp can be extended. According to the control relationship shown in FIG. 6E or 6F, a situation in which the discharge lamp current rapidly increases when a transition from constant current control to constant power control occurs can be prevented so that the load applied to the electrodes of the discharge lamp can be reduced.

In the control relationship shown in FIGS. 6B and 6E, the discharge lamp current is nonlinearly increased from the value I2 to the value I1. Note that the discharge lamp current may be linearly increased from the value I2 to the value I1. In the control relationship shown in FIGS. 6C and 6F, the discharge lamp current is linearly increased from the value I2 to the value I1. Note that the discharge lamp current may be nonlinearly increased from the value I2 to the value I1.

It is effective to combine the control relationship between the discharge lamp voltage and the amount of power supplied to the discharge lamp described with reference to FIG. 4A or 4B with either or both of the control relationship between the discharge lamp voltage and the drive frequency described with reference to FIGS. 5A to 5F and the control relationship between the discharge lamp voltage and the discharge lamp current described with reference to FIGS. 6A to 6F. For example, deterioration in the electrodes of the discharge lamp can be suppressed by combining the control relationships shown in FIGS. 4B, 5E, and 6E to reduce the amount of power supplied to the discharge lamp in the terminal stage of the discharge lamp. Moreover, deterioration in the electrodes of the discharge lamp due to melting can be prevented throughout the life of the discharge lamp by reducing the discharge lamp current and the drive frequency to such an extent that the discharge lamp is not turned off during constant current control. Therefore, the life of the discharge lamp can be further extended.

2. Projector

Figure 7:
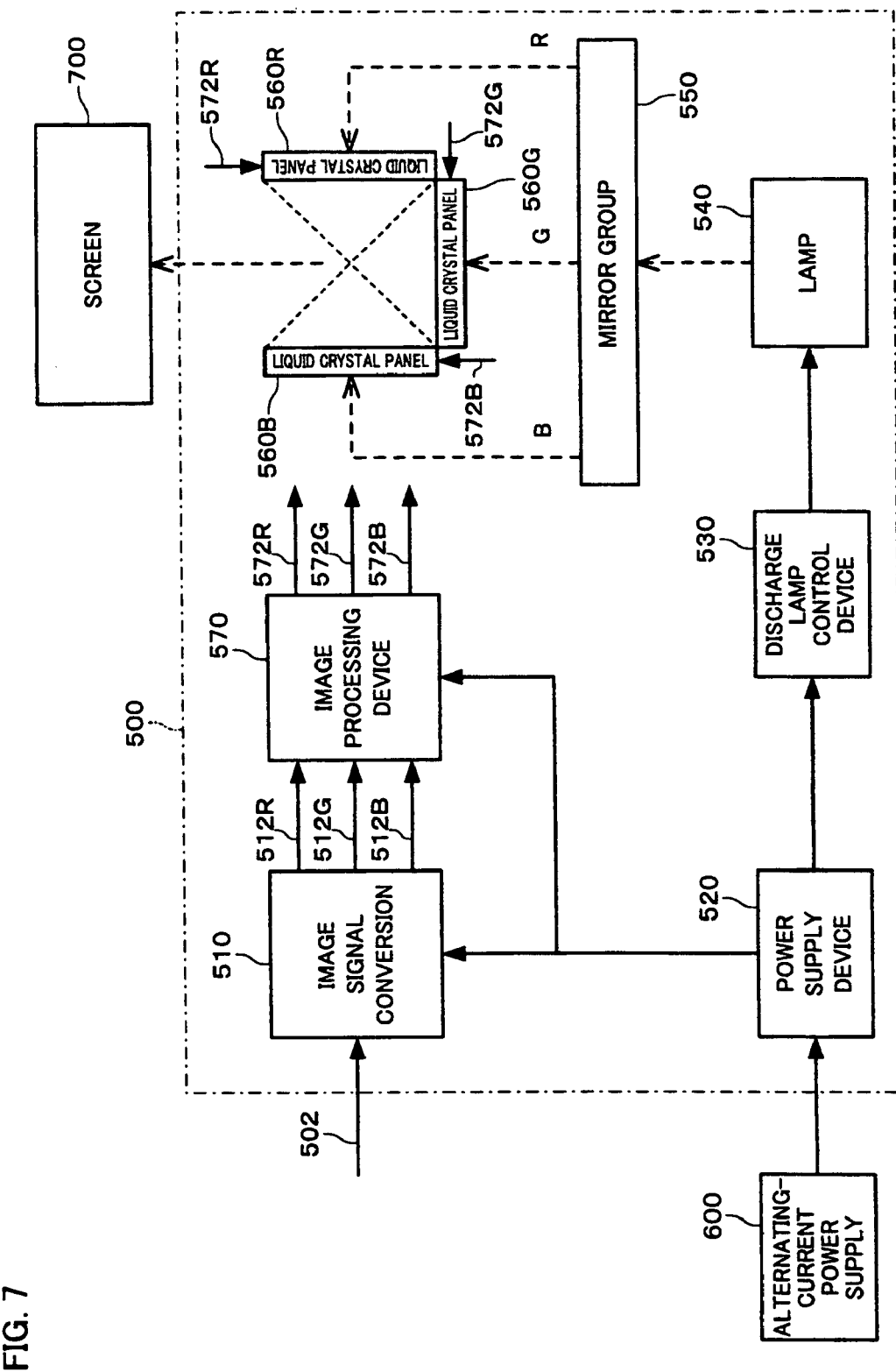
FIG. 7 is a diagram showing a configuration example of a projector according to one embodiment of the invention.
Figure 8A:
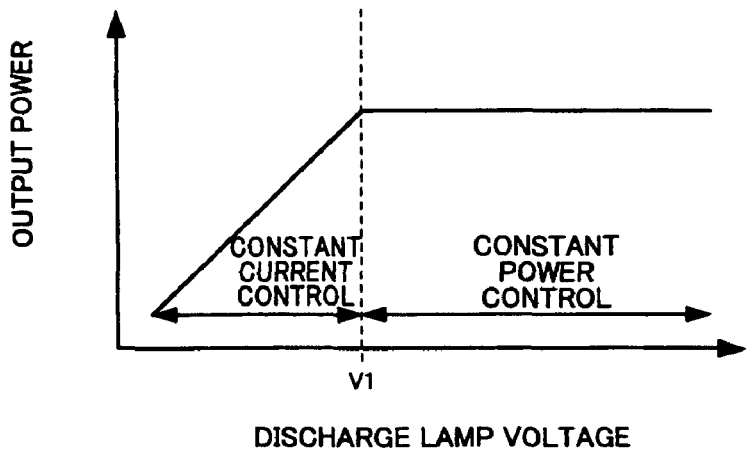
FIG. 8A shows a graph of the control relationship between a discharge lamp voltage and the amount of power supplied to a discharge lamp according to a related-art method.
Figure 8B:
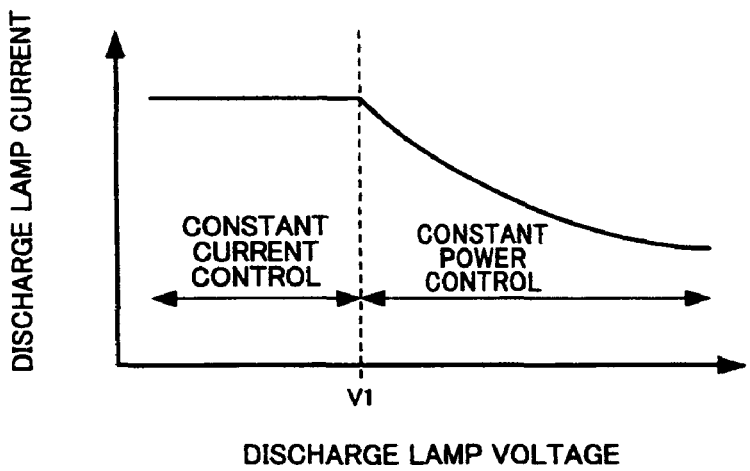
FIG. 8B shows a graph of the control relationship between a discharge lamp voltage and a discharge lamp current according to a related-art method.
Figure 8C:
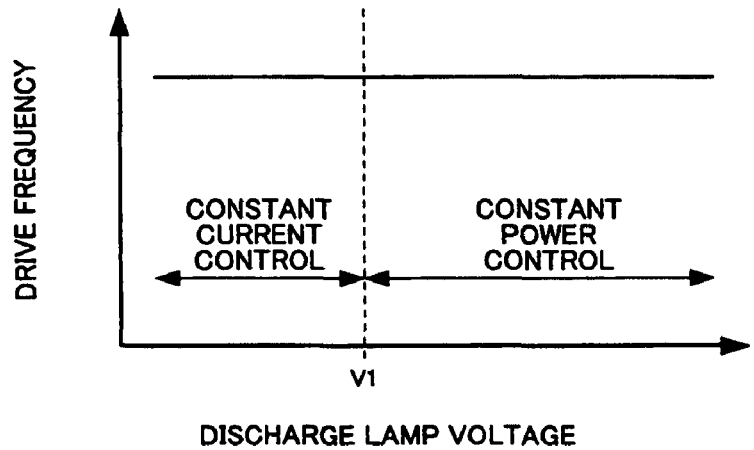
FIG. 8C shows a graph of the control relationship between a discharge lamp voltage and a drive frequency according to a related-art method.

FIG. 7 shows a configuration example of a projector according to one embodiment of the invention. A projector 500 includes an image signal conversion section 510, a power supply device 520, a discharge lamp control device 530, a lamp 540, a mirror group 550, liquid crystal panels 560R, 560G, 560B, and an image processing device 570. The image signal conversion section 510 converts an externally input image signal 502 (e.g., luminance-color difference signal or digital RGB signal) into an analog RGB signal to generate image signals 512R, 512G; and 512B, and supplies the image signals 512R, 512G; and 512B to the image processing device 570. The image processing device 570 processes the image signals 512R, 512G; and 512B, and outputs drive signals 572R, 572G; and 572B for driving the liquid crystal panels 560R, 560G; 560B, respectively.

The power supply device 520 converts an alternating-current voltage supplied from an external alternating-current power supply 600 into a constant direct-current voltage, and supplies the direct-current voltage to the image signal conversion section 510 and the image processing device 570 on the secondary-side of a transformer (not shown; included in the power supply device 520) and to the discharge lamp control device 530 on the primary-side instrument of the transformer. The discharge lamp control device 530 generates a high voltage between the electrodes of the lamp 540 to cause a dielectric breakdown between the electrodes so that a discharge path is formed, and then supplies a lamp current (discharge lamp current) for the lamp 540 to maintain discharge. A beam emitted from the lamp 540 is separated into R, G, and B beams through two dichroic mirrors included in the mirror group 550. The beams are reflected by other mirrors to enter the liquid crystal panels 560R, 560G; 560B. The liquid crystal panels 560R, 560G; 560B display images based on the drive signals 572R, 572G; and 572B, respectively. The R, G, and B beams pass through the liquid crystal panels 560R, 560G; 560B and are synthesized by a prism, and the resulting image is displayed on a screen 700.

The invention is not limited to the above-described embodiments, and various modifications can be made within the scope of the invention.

The invention includes various other configurations substantially the same as the configurations described in the embodiments (in function, method and result, or in objective and result, for example). The invention also includes a configuration in which an unsubstantial portion in the described embodiments is replaced. The invention also includes a configuration having the same effects as the configurations described in the embodiments, or a configuration able to achieve the same objective. Further, the invention includes a configuration in which a publicly known technique is added to the configurations in the embodiments.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A discharge lamp control device which controls lighting of a discharge lamp, the discharge lamp control device comprising:
    a discharge lamp driver section which drives the discharge lamp; and
    a discharge lamp drive control section which performs constant current control so that a discharge lamp current that flows between electrodes of the discharge lamp becomes constant when a discharge lamp voltage applied between the electrodes of the discharge lamp is lower than a first voltage after the discharge lamp has been lighted,
    the discharge lamp drive control section reducing an amount of power supplied to the discharge lamp according to an increase in the discharge lamp voltage when the discharge lamp voltage is equal to or higher than the first voltage after the discharge lamp has been lighted.

2. A discharge lamp control device which controls lighting of a discharge lamp, the discharge lamp control device comprising:
    a discharge lamp driver section which drives the discharge lamp; and
    a discharge lamp drive control section which performs constant current control so that a discharge lamp current that flows between electrodes of the discharge lamp becomes constant when a discharge lamp voltage applied between the electrodes of the discharge lamp is lower than a first voltage after the discharge lamp has been lighted,
    the discharge lamp drive control section performing constant power control so that an amount of power supplied to the discharge lamp becomes constant when the discharge lamp voltage is equal to or higher than the first voltage and is equal to or lower than a predetermined voltage which is higher than the first voltage after the discharge lamp has been lighted; and
    the discharge lamp drive control section reducing the amount of power supplied to the discharge lamp according to an increase in the discharge lamp voltage when the discharge lamp voltage is higher than the predetermined voltage after the discharge lamp has been lighted.

3. The discharge lamp control device as defined in claim 1,
    the discharge lamp driver section driving the discharge lamp by outputting an alternating current having a given drive frequency to the discharge lamp, and
    the discharge lamp drive control section including a discharge lamp drive frequency control section which causes the drive frequency when the discharge lamp voltage is lower than a second voltage which is equal to or lower than the first voltage to differ from the drive frequency when the discharge lamp voltage is higher than the second voltage.

4. The discharge lamp control device as defined in claim 2,
    the discharge lamp driver section driving the discharge lamp by outputting an alternating current having a given drive frequency to the discharge lamp, and
    the discharge lamp drive control section including a discharge lamp drive frequency control section which causes the drive frequency when the discharge lamp voltage is lower than a second voltage which is equal to or lower than the first voltage to differ from the drive frequency when the discharge lamp voltage is higher than the second voltage.

5. The discharge lamp control device as defined in claim 3,
    the discharge lamp drive frequency control section causing the drive frequency when the discharge lamp voltage is lower than the second voltage to be lower than the drive frequency when the discharge lamp voltage is higher than the second voltage.

6. The discharge lamp control device as defined in claim 4,
    the discharge lamp drive frequency control section causing the drive frequency when the discharge lamp voltage is lower than the second voltage to be lower than the drive frequency when the discharge lamp voltage is higher than the second voltage.

7. The discharge lamp control device as defined in claim 5,
    when the discharge lamp voltage is within a predetermined range lower than the second voltage, the discharge lamp drive frequency control section increasing the drive frequency according to an increase in the discharge lamp voltage so that the drive frequency almost successively changes when the discharge lamp voltage is in the vicinity of the second voltage.

8. The discharge lamp control device as defined in claim 6,
    when the discharge lamp voltage is within a predetermined range lower than the second voltage, the discharge lamp drive frequency control section increasing the drive frequency according to an increase in the discharge lamp voltage so that the drive frequency almost successively changes when the discharge lamp voltage is in the vicinity of the second voltage.

9. The discharge lamp control device as defined in claim 3, the first voltage being equal to the second voltage.

10. The discharge lamp control device as defined in claim 4, the first voltage being equal to the second voltage.

11. The discharge lamp control device as defined in claim 1,
the discharge lamp drive control section including a constant current control correction section which causes the discharge lamp current when the discharge lamp voltage is lower than a third voltage which is equal to or lower than the first voltage to be lower than the discharge lamp current when the discharge lamp voltage is equal to the first voltage.

12. The discharge lamp control device as defined in claim 2,
the discharge lamp drive control section including a constant current control correction section which causes the discharge lamp current when the discharge lamp voltage is lower than a third voltage which is equal to or lower than the first voltage to be lower than the discharge lamp current when the discharge lamp voltage is equal to the first voltage.

13. The discharge lamp control device as defined in claim 11,
when the discharge lamp voltage is within a predetermined range lower than the third voltage, the constant current control correction section increasing the discharge lamp current according to an increase in the discharge lamp voltage so that the discharge lamp current almost successively changes when the discharge lamp voltage is in the vicinity of the third voltage.

14. The discharge lamp control device as defined in claim 12,
when the discharge lamp voltage is within a predetermined range lower than the third voltage, the constant current control correction section increasing the discharge lamp current according to an increase in the discharge lamp voltage so that the discharge lamp current almost successively changes when the discharge lamp voltage is in the vicinity of the third voltage.

15. The discharge lamp control device as defined in claim 11, the first voltage being equal to the third voltage.

16. The discharge lamp control device as defined in claim 12, the first voltage being equal to the third voltage.

17. The discharge lamp control device as defined in claim 1, the discharge lamp being a light source of a projector.

18. The discharge lamp control device as defined in claim 2, the discharge lamp being a light source of a projector.

19. A projector comprising:
the discharge lamp control device as defined in claim 17;
the discharge lamp;
an image signal input section which inputs an image signal; and
an image signal output section which outputs the image signal.

20. A projector comprising:
the discharge lamp control device as defined in claim 18;
the discharge lamp;
an image signal input section which inputs an image signal; and
an image signal output section which outputs the image signal.

* * * * *